United States Patent
Ravani et al.

(10) Patent No.: US 9,998,176 B2
(45) Date of Patent: Jun. 12, 2018

(54) NEAR FIELD COMMUNICATION MODE ADJUSTMENT BASED ON A SCREEN STATE

(71) Applicant: QUALCOMM Incorporated, San Diego, CA (US)

(72) Inventors: Tejas Ravani, San Diego, CA (US); Gueyoung Lee, San Diego, CA (US); Dhananjai Singh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 14/577,493

(22) Filed: Dec. 19, 2014

(65) Prior Publication Data

US 2016/0043775 A1    Feb. 11, 2016

Related U.S. Application Data

(60) Provisional application No. 62/035,767, filed on Aug. 11, 2004.

(51) Int. Cl.
  *H04B 5/00* (2006.01)
  *H04W 74/06* (2009.01)
      (Continued)

(52) U.S. Cl.
  CPC ....... *H04B 5/0031* (2013.01); *G06K 7/10237* (2013.01); *G06K 7/10297* (2013.01);
      (Continued)

(58) Field of Classification Search
  CPC ..... H04W 4/008; H04W 12/06; H04W 8/005; H04W 52/0254; H04W 12/08; H04W 28/18; H04W 48/16; H04W 4/02; H04W 76/02; H04W 76/023; H04W 12/02; H04W 36/00; H04W 4/00; H04W 4/027; H04W 4/12; H04W 52/0209; H04W 52/0216; H04W 52/02; G06Q 20/3278;
      (Continued)

(56) References Cited

U.S. PATENT DOCUMENTS

2012/0040611 A1*  2/2012  Griffin .............. H04W 52/0274
                                                        455/41.1
2012/0045989 A1*  2/2012  Suumaki .............. H04W 8/005
                                                        455/41.1
      (Continued)

FOREIGN PATENT DOCUMENTS

CN      103544457 A      1/2014
EP      2 621 223 A1     7/2013
JP      2013-255039 A    12/2013

OTHER PUBLICATIONS

International Search Report and Written Opinion—PCT/US2015/040153—ISA/EPO—dated Oct. 5, 2015. (10 total pages).

*Primary Examiner* — Golam Sorowar
(74) *Attorney, Agent, or Firm* — Arent Fox, LLP

(57) ABSTRACT

The present aspects relate to adjusting an NFC mode based on a screen state indication, comprising receiving, at an NFC controller, an NFC controller interface (NCI) indication from a device host, wherein the NCI indication specifies a screen state of the device host, and adjusting one or more NFC modes at the NFC controller based on the NCI indication.

26 Claims, 8 Drawing Sheets

(51) Int. Cl.
*H04W 8/00* (2009.01)
*G06K 19/07* (2006.01)
*G06K 7/10* (2006.01)

(52) U.S. Cl.
CPC ....... *G06K 19/0727* (2013.01); *H04B 5/0025* (2013.01); *H04W 8/005* (2013.01); *H04W 74/06* (2013.01); *G06K 7/10198* (2013.01)

(58) Field of Classification Search
CPC ...... G06Q 20/18; G06Q 20/20; G06Q 20/202; G06Q 20/223; G06Q 20/227; G06Q 20/24; G06Q 20/32; G06Q 20/322; G06Q 20/3226; G06Q 20/3229; G06Q 20/327; G06Q 20/352; G06Q 20/3572; G06Q 20/3829; G06Q 20/401; H04B 5/0031; H04B 5/02; H04B 5/00; H04B 5/0025; H04B 5/0037; H04B 5/0075
See application file for complete search history.

(56) References Cited

U.S. PATENT DOCUMENTS

| | | |
|---|---|---|
| 2013/0073448 A1 | 3/2013 | Wall et al. |
| 2013/0079026 A1* | 3/2013 | Hagedorn ............ H04W 4/027 455/456.1 |
| 2013/0154926 A1 | 6/2013 | Kim et al. |
| 2013/0196594 A1* | 8/2013 | Moosavi ................ H04B 5/00 455/41.1 |
| 2013/0203347 A1* | 8/2013 | Moosavi ........... H04W 52/0254 455/41.1 |
| 2013/0304635 A1 | 11/2013 | Cho et al. |
| 2014/0087660 A1 | 3/2014 | Kim et al. |
| 2015/0134513 A1* | 5/2015 | Olson ............. G06K 19/06206 705/39 |

* cited by examiner

| RF COMMUNICATION STATE \ SCREEN STATE | ON | OFF | LOCK |
|---|---|---|---|
| POLL | PEER-TO-PEER READER/WRITER | — | — |
| LISTEN | PEER-TO-PEER CARD EMULATION HOST SECURE ELEMENT OR UICC OR EMBEDDED SECURE ELEMENT | CARD EMULATION UICC OR EMBEDDED SECURE ELEMENT | CARD EMULATION HOST SECURE ELEMENT OR UICC OR EMBEDDED SECURE ELEMENT |

NEAR FIELD COMMUNICATION MODE ADJUSTMENT BASED ON A SCREEN STATE

CLAIM OF PRIORITY UNDER 35 U.S.C § 119

The present application for patent claims priority to Provisional Application No. 62/035,767 entitled "NEAR FIELD COMMUNICATION MODE ADJUSTMENT BASED ON A SCREEN STATE" filed Aug. 11, 2014, assigned to the assignee hereof and hereby expressly incorporated herein by reference.

BACKGROUND

The disclosed aspects relate generally to communications between and/or within devices and specifically to improving near field communication mode adjustments.

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Many such cellular telephones are manufactured with ever increasing computing capabilities, and as such, are becoming tantamount to small personal computers and hand-held PDAs. Further, such devices are enabling communications using a variety of frequencies and applicable coverage areas, such as cellular communications, wireless local area network (WLAN) communications, near field communication (NFC), etc.

In some NFC devices, ineffective and/or inefficient operation or utilization of communication resources, particularly related to NFC mode adjustments, may lead to degradations in communication between an NFC device and a device in communication therewith. Even more, the foregoing ineffective and/or inefficient operation may inhibit a user equipment equipped with an NFC device from achieving higher communication quality. Thus, improvements in NFC mode adjustments may be desired.

SUMMARY

The following presents a summary of one or more aspects to provide a basic understanding of such aspects. This summary is not an extensive overview of all contemplated aspects, and is not intended to identify key or critical elements of all aspects nor delineate the scope of any or all aspects. Its purpose is to present some concepts of one or more aspects form as a prelude to the more detailed description presented later.

In an aspect, a method of near field communication (NFC) relates to adjusting an NFC mode based on a screen state indication. The method includes receiving, at an NFC controller, an NFC controller interface (NCI) indication from a device host, wherein the NCI indication specifies a screen state of the device host, and adjusting one or more NFC modes at the NFC controller based on the NCI indication.

In another aspect, a computer-readable medium storing computer executable code for near field communication (NFC) relates to adjusting an NFC mode based on a screen state indication. The computer-readable medium includes code executable to receive, at an NFC controller, an NFC controller interface (NCI) indication from a device host, wherein the NCI indication specifies a screen state of the device host, and code executable to adjust one or more NFC modes at the NFC controller based on the NCI indication.

In a further aspect, an apparatus for near field communication (NFC) relates to adjusting an NFC mode based on a screen state indication. The apparatus includes means for receiving, at an NFC controller, an NFC controller interface (NCI) indication from a device host, wherein the NCI indication specifies a screen state of the device host, and means for adjusting one or more NFC modes at the NFC controller based on the NCI indication.

In yet another aspect, an apparatus relates to adjusting an NFC mode based on a screen state indication. The apparatus includes an NFC controller configured to receive an NFC controller interface (NCI) indication from a device host, wherein the NCI indication specifies a screen state of the device host, and configured to adjust one or more NFC modes at the NFC controller based on the NCI indication.

To accomplish the foregoing and related ends, the one or more aspects comprise features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

To facilitate a fuller understanding of the present disclosure, reference is now made to the accompanying drawings, in which like elements are referenced with like numerals, and where dashed lines may indicate optional components or actions. These drawings should not be construed as limiting the present disclosure, but are intended to be illustrative only, wherein:

FIG. 4 is a conceptual diagram of an NFC mode chart in accordance with an aspect of the present disclosure.

DETAILED DESCRIPTION

Figure 1:
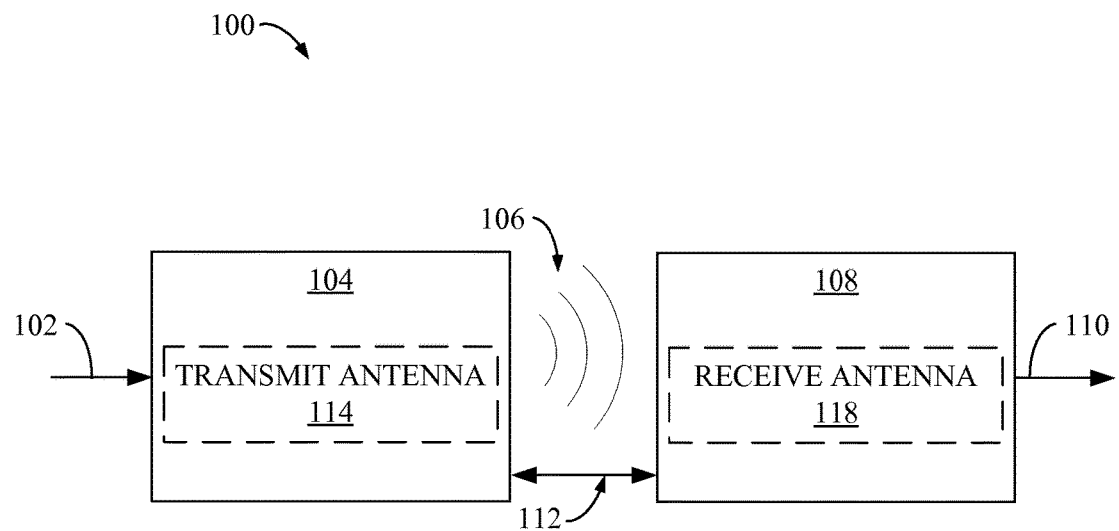
FIG. 1 is a block diagram of a wireless communication system in accordance with an aspect of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known components are shown in block diagram form in order to avoid obscuring such concepts. In an aspect, the term "component" as used herein may be one of the parts that make up a system, may be hardware or software, and may be divided into other components.

The present aspects generally relate to adjusting one or more NFC modes of an NFC device based on an indication specifying a screen state. Specifically, an NFC device may operate according to one or more NFC modes. A NFC device may operate in a reader/writer mode, a peer-to-peer mode, and a card emulation mode. In the reader/writer mode, the NFC device emits an electromagnetic field that powers a passive transponder/tag. Operating in this mode, the NFC device may read and alter data stored in NFC compliant passive (e.g., without battery) transponders/tags. Such tags may permit the retrieval of additional information by reading the tag with the NFC device. The peer-to-peer mode (e.g., ISO 18092) may permit two NFC devices to establish a bidirectional connection to exchange data. In the card emulation mode, an NFC device may act as or perform functions similar to a smart card (e.g., ISO 14443). The emulated smart card may then be accessed by an external NFC reader, such as, but not limited to, an NFC point-of-sale terminal.

Specifically, in an aspect, an NFC device may include a card emulation mode and a peer-to-peer mode as two example modes. The peer-to-peer mode may be implemented when a device host is present. Further, the card emulation mode may be implemented with or without the presence of the device host, yet may operate in conjunction with a secure element connected to an NFC controller of the NFC device. In an aspect, for example, the secure element may include or otherwise take the form of, but is not limited to, a universal integrated circuit card (UICC) or an embedded secure element.

In aspects where an NFC device is integrated with or otherwise included as part of a user equipment (e.g., mobile device), the peer-to-peer mode may not be available when the device host is not present or not in operation. For example, in an aspect, the device host may include a user interface (e.g., a display or screen or display screen) of the user equipment, which may not be active or available (e.g., alternatively referred to as a screen OFF state). When changing the screen states (e.g., screen ON state to/from screen OFF state), the peer-to-peer mode may be enabled or disabled, respectively. As such, the device host may notify each change in screen state to the NFC Controller via, for example, an NFC controller interface.

The NFC controller interface may support the changes in screen state by providing or otherwise communicating a number or sequence of indications/commands corresponding to a change in screen state. For instance, the device host may send an RF_DEACTIVATE_COMMAND followed by an RF_DISCOVER_CMD (e.g., with new discovery parameters) and CORE_SET_CONFIG_CMD (e.g., with new radio frequency configuration registries). As such, in a user equipment (e.g., mobile device) including an NFC device, each time the user equipment screen changes from ON/OFF, the foregoing deactivation, discovery and setting configuration commands/indications may be sent to the NFC controller, which may disrupt, delay, or otherwise prevent the NFC device from performing listening and/or polling. Accordingly, use of the NFC device during such period may result in a failed NFC operation.

As such, the present aspects may provide an efficient and effective solution, as compared to current solutions, to adjust one or more NFC modes of an NFC device (e.g., at or via an NFC controller) based on a single NFC controller interface (NCI) indication that includes an identification of a screen state of the device host. For example, an NFC controller may determine one or more NFC modes to perform or execute based on a single NCI indication/command including a screen state of the device host. Specifically, the device host may send an NCI indication/command notifying/signifying the NFC controller of a new screen state. The new screen state may indicate to or trigger the NFC Controller to adjust the RF Discovery Parameters and/or the related RF configuration settings.

In such aspect, a single NCI indication/command may replace or be used in lieu of a number or sequence (e.g., three in some cases) NCI indications/commands. Moreover, the single NCI indication/command including the screen state may be configured to be an unacknowledged type of command, e.g., where a response acknowledging receipt is not necessary. In contrast, the existing number of sequence of NCI commands require an acknowledgement. As such, the present aspects may decrease the NCI traffic (e.g., data transmission along the NCI) and may reduce a time delay for processing the screen changes at the NFC controller. Further, the time during which the NFC device may be available or active may increase, thereby decreasing the communication failure rate/probability. Accordingly, the present aspects provide enhanced NFC mode adjustments.

Aspects of the present disclosure are depicted with reference to one or more components and one or more methods that may perform the actions or functions described herein. In an aspect, the term "component" as used herein may be one of the parts that make up a system, may be hardware or software or some combination thereof, and may be divided into other components. Although the operations described herein are presented in a particular order and/or as being performed by an example component, it should be understood that the ordering of the actions and the components performing the actions may be varied, depending on the implementation. Moreover, it should be understood that the following actions or functions may be performed by a specially-programmed processor, a processor executing specially-programmed software or computer-readable media, or by any other combination of a hardware component and/or a software component capable of performing the described actions or functions.

Figure 3:
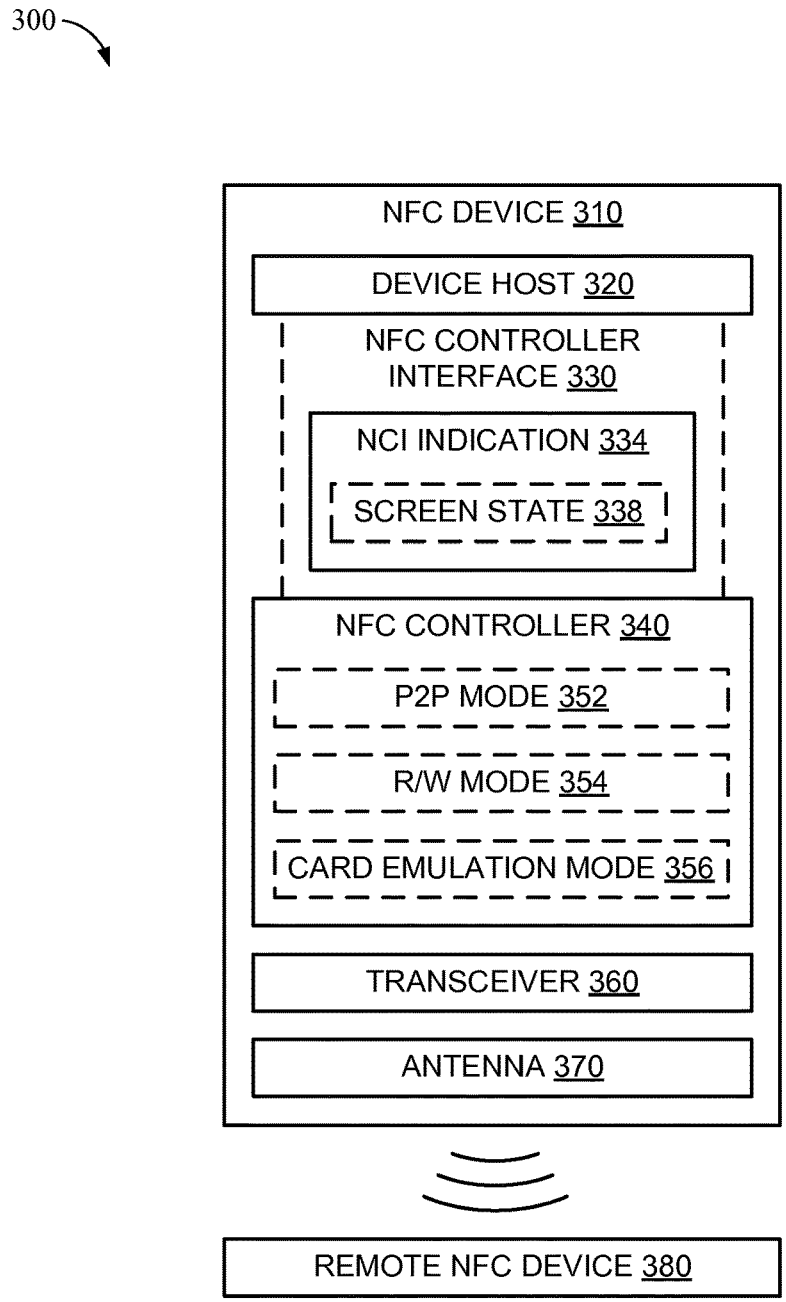
FIG. 3 is a block diagram of an NFC environment in accordance with an aspect of the present disclosure.

FIG. 1 illustrates a wireless transmission or charging system 100, in accordance with various aspects described herein. In some aspects, transmitter 104 may be included as part of NFC device 310 (FIG. 3). Specifically, for example, transmitter 104 may form or otherwise be part of transceiver 360 (FIG. 3). Additionally, transmit antenna may form otherwise be part of antenna 370 (FIG. 3). Input power 102 is provided to a transmitter 104 for generating a radiated inductive field 106 for providing energy transfer. A receiver 108 couples to the radiated inductive field 106 and generates an output power 110 for storage or consumption by a device (not shown) coupled to the output power 110. Both the transmitter 104 and the receiver 108 are separated by a distance 112, which is also referred to herein as an operating volume (OV). In one example, transmitter 104 and receiver 108 are configured according to a mutual resonant relationship and when the resonant frequency of receiver 108 and the resonant frequency of transmitter 104 are within a threshold OV, transmission losses between the transmitter 104 and the receiver 108 are minimal (e.g., when the receiver 108 is located in the "near-field" of the radiated inductive field 106).

Transmitter 104 further includes a transmit antenna 114 for transmitting energy and signals. A receiver 108 includes a receive antenna 118 for receiving signal and energy if needed. The transmit antenna 114 and receive antenna 118 can be sized according to applications and devices associated therewith. As stated, an efficient energy transfer can occur by coupling a large portion of the energy in the near-field of the transmitting antenna 114 to a receiving antenna 118 rather than propagating most of the energy in an electromagnetic wave to a far field. When in this near-field, a coupling mode may be developed between the transmit antenna 114 and the receive antenna 118. The area around the antennas 114 and 118 where this near-field coupling may occur is referred to herein as a coupling-mode region.

In some configurations, where the transmitter 104 and receiver 108 are in very close proximity, matching networks (not shown) related to the antennas 114, 118 that process the signals may become detuned due to high mutual coupling in signals communicated between the transmitter 104 and receiver 108, and thus communications between transmitter 104 and receiver 108 may break down. This condition is referred to herein as over-coupling. In such examples, as described further herein, transmitter 104 can detect such over-coupling with receiver 108 or related receive antenna 118, and can attempt to mitigate the condition by modifying one or more transmit and/or receive parameters at transmitter 104.

Figure 2:
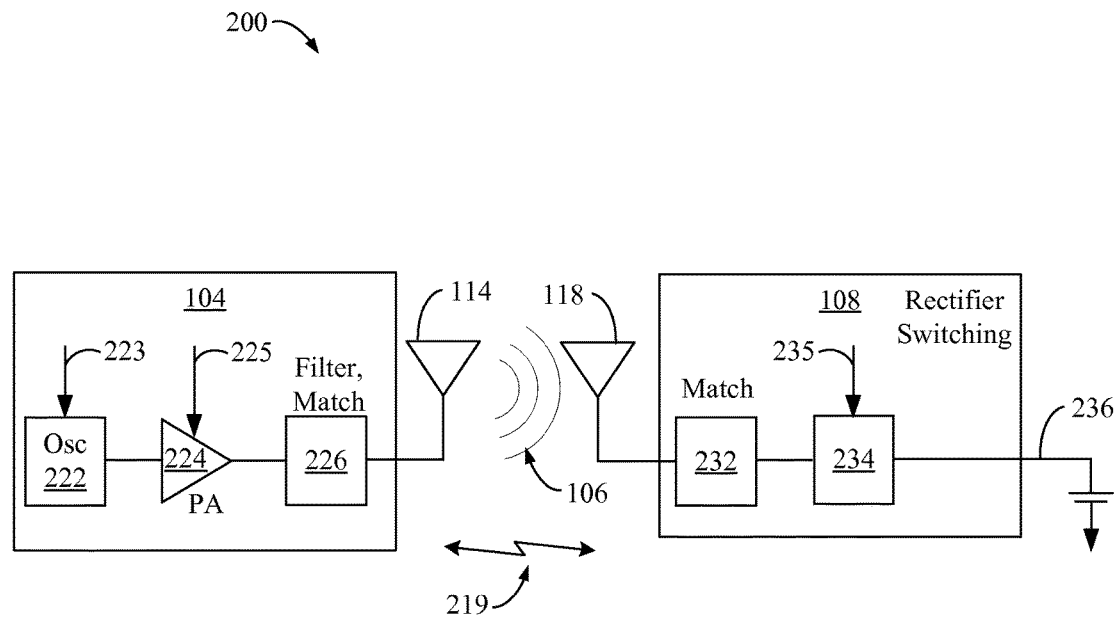
FIG. 2 is a schematic diagram of a wireless communication system in accordance with an aspect of the present disclosure.

FIG. 2 is a schematic diagram of an example near field wireless communication system 200. The transmitter 104 includes an oscillator 222, a power amplifier 224 and a filter and matching circuit 226. In some aspects, transmitter 104 may be included as part of NFC device 310 (FIG. 3). Specifically, for example, transmitter 104 may form or otherwise be part of transceiver 360 (FIG. 3). Additionally, transmit antenna may form otherwise be part of antenna 370 (FIG. 3). The oscillator 222 is configured to generate a signal at a desired frequency, which may be adjusted in response to adjustment signal 223. The oscillator signal may be amplified by the power amplifier 224 with an amplification amount responsive to control signal 225. The filter and matching circuit 226 may be included to filter out harmonics or other unwanted frequencies and match the impedance of the transmitter 104 to the transmit antenna 114.

The receiver 108 may include a matching circuit 232 and a rectifier and switching circuit 234 to generate a DC power output to charge a battery 236 as shown in FIG. 2 or power a device coupled to the receiver (not shown), though it is to be appreciated that devices may each have batteries (e.g., in peer-to-peer communications) such that powering by magnetic field may not be needed. The matching circuit 232 may be included to match the impedance of the receiver 108 to the receive antenna 118. The receiver 108 and transmitter 104 may communicate on a separate communication channel 219 (e.g., Bluetooth, WiFi, zigbee, cellular, etc), in one example.

Referring to FIG. 3, in an aspect, communication network 300 may include an NFC device 310 and a remote NFC device 380, both of which may be configured to communicate using NFC. NFC device 310 may include transceiver 360 and antenna 370, each of which may be configured to facilitate communication with remote NFC device 380 using NFC. For example, remote NFC device 380 may correspond to a remote device, card, or tag, connected wirelessly over the NFC radio interface to the NFC device 310. NFC device 310 may, via NFC controller 340, be configured to efficiently adjust an NFC mode based on receiving an NCI indication 334 specifying a screen state 338 of an associated user interface.

Device host 320 may be configured to provide or otherwise transmit an NCI indication 334 including or specifying a screen state 338 of the device host 320 over the NFC controller interface (NCI) 330 to NFC controller 340. In some aspects, the screen state 338 may be an indicator that identifies or indicates one of a screen state ON, a screen state OFF or a screen state LOCK. Further, the device host 320 may be or otherwise take the form of an execution environment responsible for the overall management of the NFC device 310 and any peripherals. This may include the management (e.g., initialization, configuration, power management, etc.) of the NFC controller 340.

NCI 330 may be configured to facilitate communication at least between the device host 320 and the NFC controller 340. For example, the NCI 330 may be the logical interface between device host 320 and NFC controller 340. Specifically, NCI 330 may be configured to facilitate the transmission of the NCI indication 334 including or specifying the screen state 338 of an associated user interface from device host 320 to NFC controller 340. In some aspects, the screen state 338 may be different from a previous screen state of the device host 320 (e.g., change from screen state ON to screen state OFF).

NFC controller 340 may be configured to receive the NCI indication 334 specifying screen state 338 of the device host 320 and adjust one or more NFC modes (e.g., peer-to-peer (P2P) mode 352, reader/writer (R/W) mode 354 and/or card emulation mode 356) based on the screen state 338 specified or included in the NCI indication 334. For example, the NFC controller 340 may be the logical entity responsible for the transmission of data over the NFC radio interface. The NFC controller 340 may have a logical connection NCI 330 and thus to the device host 320, and may have connections to additional NFC execution environments (NFCEEs). Further, NFC controller 340 may include a receiver function, which may be hardware, such as a programmed processor module, or computer-executable code executable by a processor, or some combination thereof, that operates to receive the NCI indication 334 from NCI 330 for further processing by NFC controller 340.

Hence, NFC controller 340 may be configured to adjust an NFC mode based on a single NCI indication 334 specifying screen state 338 and independent of, or without any additional indications/commands received from device host 320. For example, NFC controller 340 may include an adjusting function, which may be hardware, such as a programmed processor module, or computer-executable code executable by a processor, or some combination thereof, that operates to adjust an NFC mode based on a single NCI indication 334 specifying screen state 338 and independent of, or without any additional indications/commands received from device host 320. Moreover, the single NCI indication 334 including the screen state 338 may be an unacknowledged type of command, e.g., where a response acknowledging receipt is not necessary. Additionally, NFC controller 340 may be configured to maintain an RF discovery state before, during and/or after receiving the NCI indication 334 and adjusting the one or more NFC modes. For example, NFC controller 340 may include a maintaining function, which may be hardware, such as a programmed processor module, or computer-executable code executable by a processor, or some combination thereof, that operates to maintain an RF discovery state before, during and/or after receiving the NCI indication 334 and adjusting the one or more NFC modes. That is, as opposed to transitioning to and from idle state after receiving an NCI indication 334 (e.g., resulting in an RF deactivation), NFC controller 340 may be configured to receive the NCI indication 334 including the screen state 338 and adjust one or more NFC modes based thereon while maintaining an RF discovery state (e.g., without transitioning into the RF idle state).

For example, NFC controller 340 may be configured to adjust, via the adjusting function, to one or more of a P2P mode 352, a R/W mode 354, or a card emulation mode 356 based on the screen state 338. Further, each of the NFC modes may also correspond to an RF communication state such as polling and/or listening. For example, during the polling state/mode, the NFC device 310 may generate a carrier and probe ("poll") for other devices. In other aspects, during the listening state/mode, the NFC device 310 may not generate a carrier, and rather listen for an RF field of another device.

Specifically, for instance, NFC controller 340 may be configured to adjust, via the adjusting function, to a polling state and a listening state corresponding to the screen state ON. In other words, when NCI indication 334 includes a screen state 338 specifying a screen state ON, the polling state and the listening state may be activated. In some aspects, the polling state includes one or both of P2P mode 352 and R/W mode 354. Additionally, the listening state may include card emulation mode 356.

Further, for example, NFC controller 340 may be configured to adjust, via the adjusting function, to a listening state corresponding to the screen state OFF and the screen state LOCK. In other words, when NCI indication 334 includes a screen state 338 of either screen state OFF or screen state LOCK, the listening state may be activated. In some aspects, the listening state includes a card emulation mode 356. However, the card emulation mode 356 of screen state OFF and screen state LOCK may vary. For instance, card emulation mode 356 for screen state OFF may be activated in accordance with a UICC or an embedded secure element. On the other hand, card emulation mode 356 for screen state LOCK may be activated in accordance with a host secure element. In other aspects, NFC controller 340 may be configured to adjust the one or more NFC modes by adjusting one or both of a radio frequency discovery mode or a radio frequency configuration mode.

Referring to FIG. 4, a conceptual diagram of an NFC mode chart 400 in accordance with an aspect described herein is illustrated. NFC mode chart 400 presents the potential NFC modes that may be performed or otherwise triggered as active based at least in part on the screen state. In other words, an NFC controller (e.g., NFC controller 340, FIG. 3) may adjust an NFC mode upon or based on receiving a single NCI indication (e.g., NCI indication 334, FIG. 1) specifying a screen state of device host (e.g., device host 320, FIG. 1).

In an aspect, according to NFC mode chart 400, screen state ON may trigger an RF communication state of poll/polling, and thereby activate the peer-to-peer mode and reader/writer mode. However, screen state OFF and screen state LOCK may not trigger an RF communication state of poll/polling. Further, screen state ON may also trigger an RF communication state of listen/listening, and thereby activate the peer-to-peer mode and/or card emulation mode. In such aspect, the card emulation mode may be activated in accordance with a host secure element, a UICC, or an embedded secure element.

Additionally, screen state OFF may trigger an RF communication state of listen/listening, and thereby activate the card emulation mode in accordance with a UICC or an embedded secure element. Similarly, screen state LOCK may trigger an RF communication state of listen/listening, and thereby activate the card emulation mode in accordance with a host secure element, a UICC, or an embedded secure element.

Figure 5:
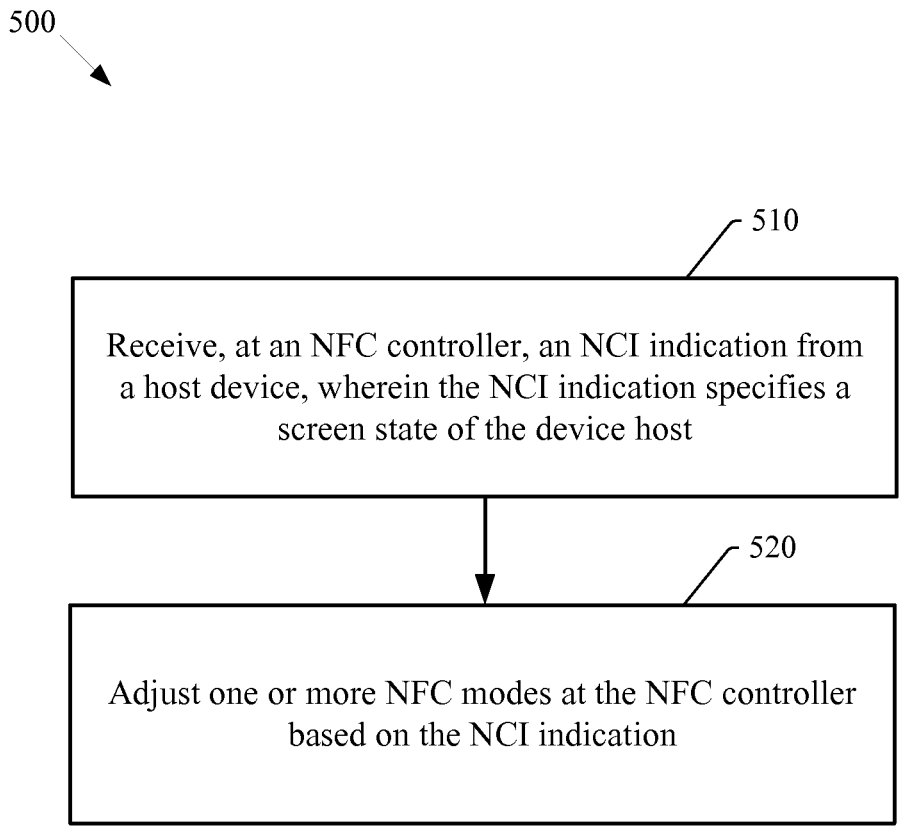
FIG. 5 is a flowchart describing an aspect of adjusting an NFC mode based on a screen state indication.

Referring to FIG. 5, in an operational aspect, an NFC device such as NFC device 310 (FIG. 3) may perform one aspect of a method 500 for adjusting one or more NFC modes based on an NCI indication. While, for purposes of simplicity of explanation, the method is shown and described as a series of acts, it is to be understood and appreciated that the method (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

In an aspect, at block 510, method 500 may receive, at an NFC controller, an NCI indication from a device host, wherein the NCI indication specifies a screen state of the device host. For example, as described herein, NFC device 310 (FIG. 3) may execute NFC controller 340 (FIG. 3) to receive an NCI indication 334 (FIG. 3) from a device host 320 (FIG. 3). In some aspects, the NCI indication 334 (FIG. 3) may specify a screen state 338 (FIG. 3) of the device host 320 (FIG. 3).

At block 520, method 500 may adjust one or more NFC modes at the NFC controller based on the NCI indication. For instance, as described herein, NFC device 310 (FIG. 3) may execute NFC controller 340 (FIG. 3) to adjust one or more NFC modes at the NFC controller 340 (FIG. 3) based on the NCI indication 334 (FIG. 3).

Figure 6A:
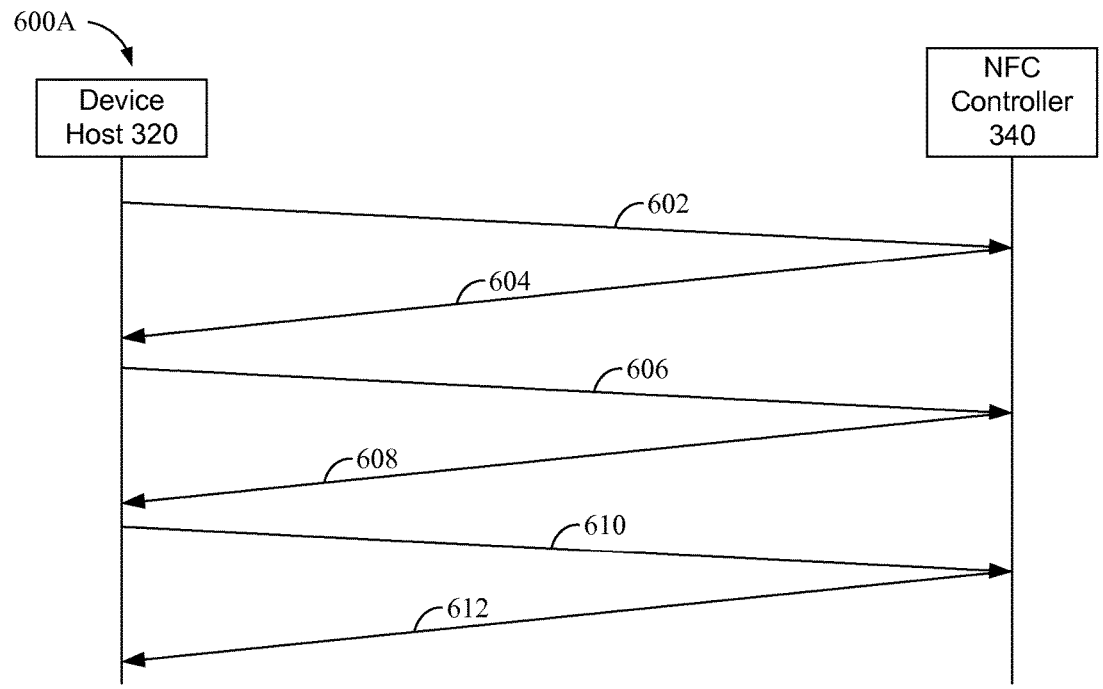
FIG. 6A is a conceptual diagram of an NFC mode signaling in accordance with an aspect of a prior disclosure.

Referring to FIG. 6A, a conceptual diagram of a prior signaling scheme 600A between a device host, such as device host 320, and a NFC controller, such as NFC controller 340. In certain aspects, device host 320 may communicate with NFC controller 340 via a NFC communication interface (NCI), such as NCI 330 of FIG. 3. For example, the NCI 330 may be the logical interface between device host 320 and NFC controller 340. The signaling scheme 600A corresponds to the instances where device host 320 is configured to transmit a plurality of indications/commands (e.g., signals 602, 606, and 610) instead of a single NCI indication 334 to the NFC controller 340. For instance, device host 320 may transmit signal 602 to NFC controller 340. In an aspect, for example, signal 602 may be or may include an RF_DEACTIVATE_COMMAND signal. In response to signal 602, NFC controller 340 may transmit signal 604, which may be or may include an acknowledgment signal indicating that signal 602 was received. Device host 320 may then transmit signal 606, which may be or may include an RF_DISCOVER_CMD signal (e.g., with new discovery parameters). In response to signal 606, NFC controller 340 may transmit signal 608, which may be or may include an acknowledgment signal indicating that signal 606 was received. Device host 320 may then transmit signal 610, which may be or may include a CORE_SET_CONFIG_CMD signal (e.g., with new radio frequency configuration registries). In response to signal 610, NFC controller 340 may transmit signal 612, which may be or may include an acknowledgment signal indicating that signal 610 was received. As such, in a user equipment (e.g., mobile device) including an NFC device, such as NFC device 310 of FIG. 3, each time the user equipment screen changes between ON and OFF, the foregoing deactivation, discovery and setting configuration commands/indications, e.g., signal 602, signal 606, and signal 610, may be sent to the NFC controller 340, which may disrupt, delay, or otherwise prevent the NFC device 310 from performing listening and/or polling. Accordingly, use of the NFC device 310 during such period may result in a failed NFC operation.

Figure 6B:
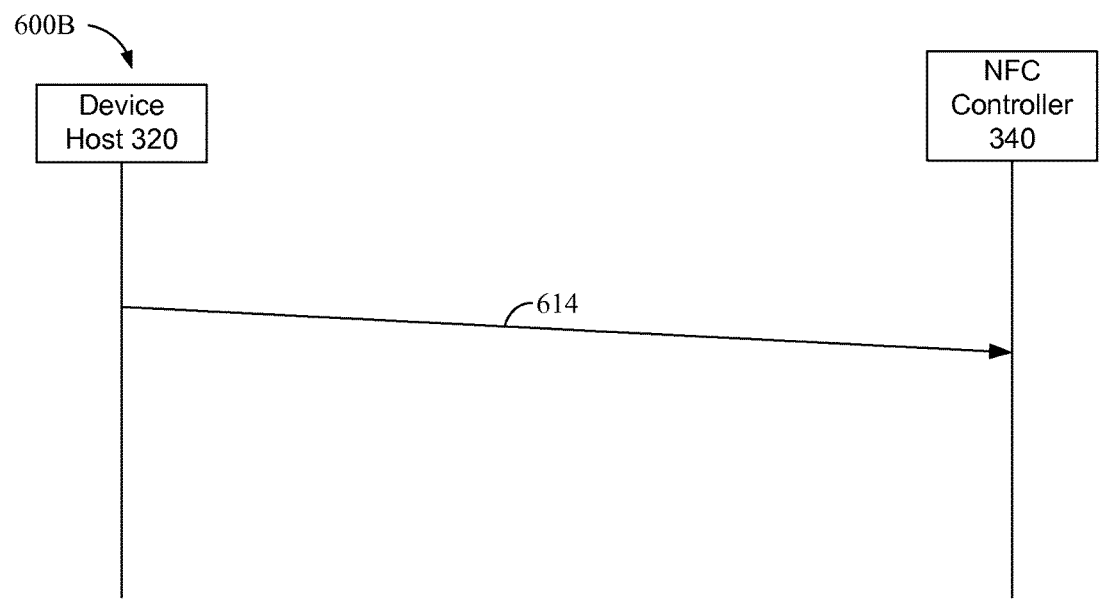
FIG. 6B is a conceptual diagram of an NFC mode signaling in accordance with an aspect of the present disclosure.

Referring to FIG. 6B, a conceptual diagram of a signaling scheme 600B between a device host, such as device host 320, and a NFC controller, such as NFC controller 340 in accordance with an aspect described herein is illustrated. In certain aspects, device host 320 may communication with NFC controller 340 via a NFC communication interface (NCI), such as NCI 330 of FIG. 3. For example, the NCI 330 may be the logical interface between device host 320 and NFC controller 340. The signaling scheme 600B corresponds to the instances where device host 320 is configured to transmit a single NCI indication 334 to NFC controller 340. For instance, device host 320 may transmit signal 614 to NFC controller 340. Signal 614, which may be or may include an NFC indication, such as NCI indication 334 of FIG. 3. In some instances, NCI indication 334 may include a screen state, such as screen state 338, and NCI indication 334 may be independent of, or without any, additional indications/commands received from device host 320 in order to cause deactivation, discovery and setting configuration relating to changes in the ON or OFF state of the user equipment screen. Moreover, the signal 614 may be configured to be an unacknowledged type of command, e.g., where a response acknowledging receipt is not necessary. Additionally, NFC controller 340 may be configured to maintain an RF discovery state before, during and/or after receiving the signal 614 and adjusting the one or more NFC modes. That is, as opposed to transitioning to and from idle state after receiving an signal 614 (e.g., resulting in an RF deactivation), NFC controller 340 may be configured to receive the signal 614 including the screen state and adjust one or more NFC modes based thereon while maintaining an RF discovery state (e.g., without transitioning into the RF idle state). As such, according to the present aspects, only a single indication/command, e.g., NCI indication 334, is necessary to be transmitted from the device host 320 to NFC controller 340 in order to indicate the screen state of the NFC device and cause deactivation, discovery and setting configuration relating to changes in the ON or OFF state of the user equipment screen.

Figure 7:
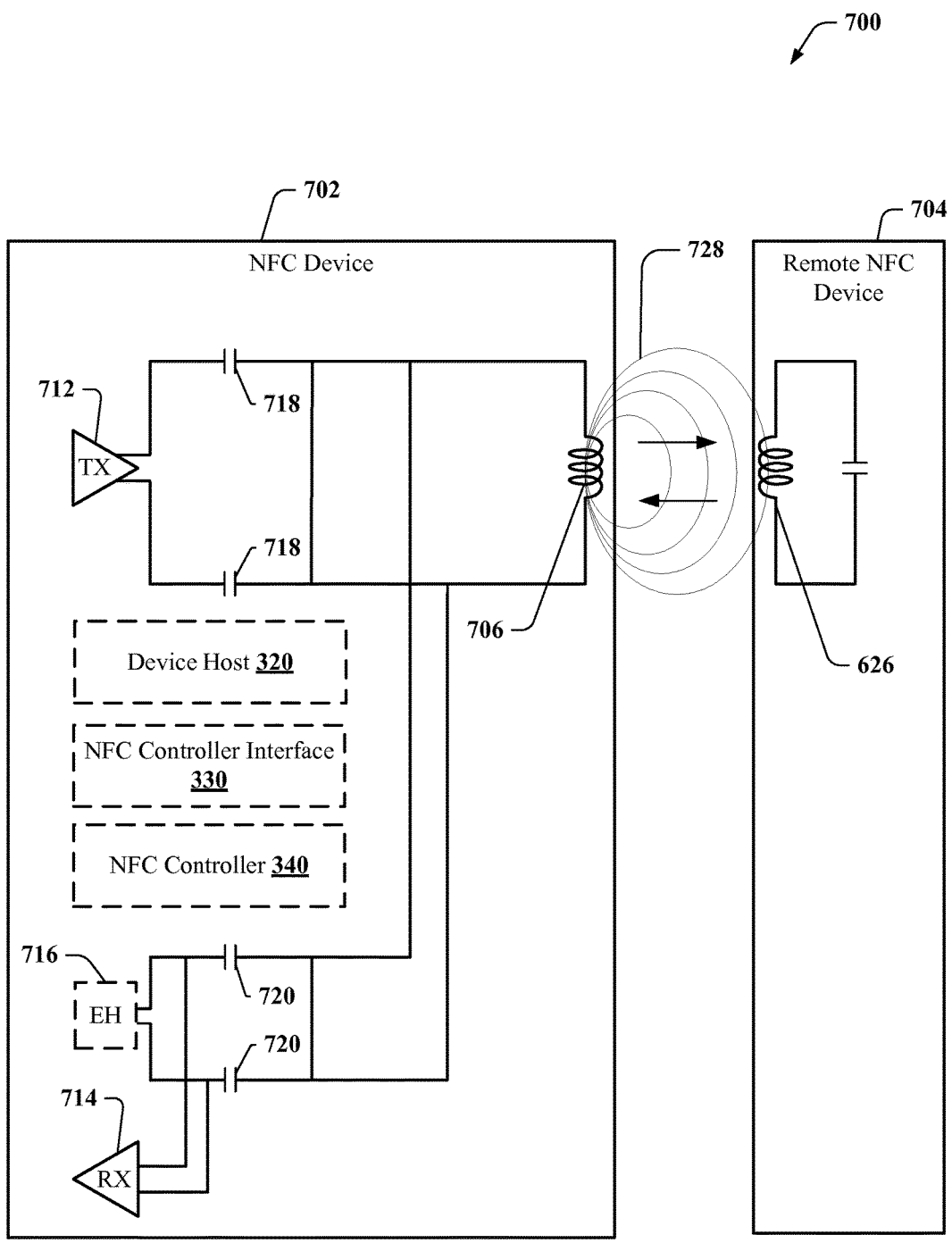
FIG. 7 is a block diagram of another NFC environment in accordance with an aspect of the present disclosure.

With reference to FIG. 7, a block diagram of a communication network 700 according to an aspect is illustrated. Communication network 300 may include a NFC device 702 and a remote NFC device 704 that may be configured to communicate using NFC. NFC device 302 may include a NFC antenna coil 706 configured to facilitate NFC communications with remote NFC device 704, which may have a similar NFC coil 726. NFC device 702 may be the same as or similar to NFC device 310 (FIG. 3). For example, NFC device 702 may include device host 320 (FIG. 3), NFC controller interface (FIG. 3) and NFC controller 340 (FIG. 3). Further, remote NFC device 704 may be the same as or similar to remote NFC device 380 (FIG. 3).

As part of NFC communications, NFC antenna coil 706 may generate an electromagnetic field in the area around the NFC antenna coil 706. The strength of the field may depend on the power source and the size and number of turns in NFC antenna coil 706. Further, impedance mismatches may cause a range of amplitude/phase changes dependant on size and inductance of NFC antenna coil 706 in the magnetic field 728. Capacitor 718 may be connected in parallel with the NFC antenna coil 706, where a transmitter component 712 and capacitors 718 may form an RLC oscillator establishing a resonant circuit with a frequency that corresponds to one or more transmission frequencies of the NFC device 702.

Because the wavelength of the frequency used is several times greater than the close proximity distance between the NFC antenna coil 706 and the antenna coil 726 of the remote NFC device 304, the electromagnetic field can be treated as an alternating magnetic field 728. This region of close proximity is referred to as the near field region. The NFC device 702 and remote NFC device 704 may be linked by their mutual inductance, as in an air core transformer, with the primary coil being the NFC antenna coil 306 and the secondary coil being the antenna coil 726 of the remote NFC device 704. The alternating magnetic field 728 penetrates the antenna coil 726 of the remote NFC device 304 when it is in the near field region, inducing an alternating current in the antenna coil 726 of the remote NFC device 704.

When operating in a listening mode, the NFC antenna coil 706, capacitors 720, optional energy harvester (EH) 716 and a receiver component 714 may form an RLC oscillator establishing a resonant circuit over which modulation of signal by remote NFC device 704 can be detected. When operating in a transmitting mode, NFC device 702 may apply a variable load resistance to the NFC antenna coil 706, thereby modulating magnetic field 728, to send a transmitted signal to transfer data to the remote NFC device 704.

Figure 8:
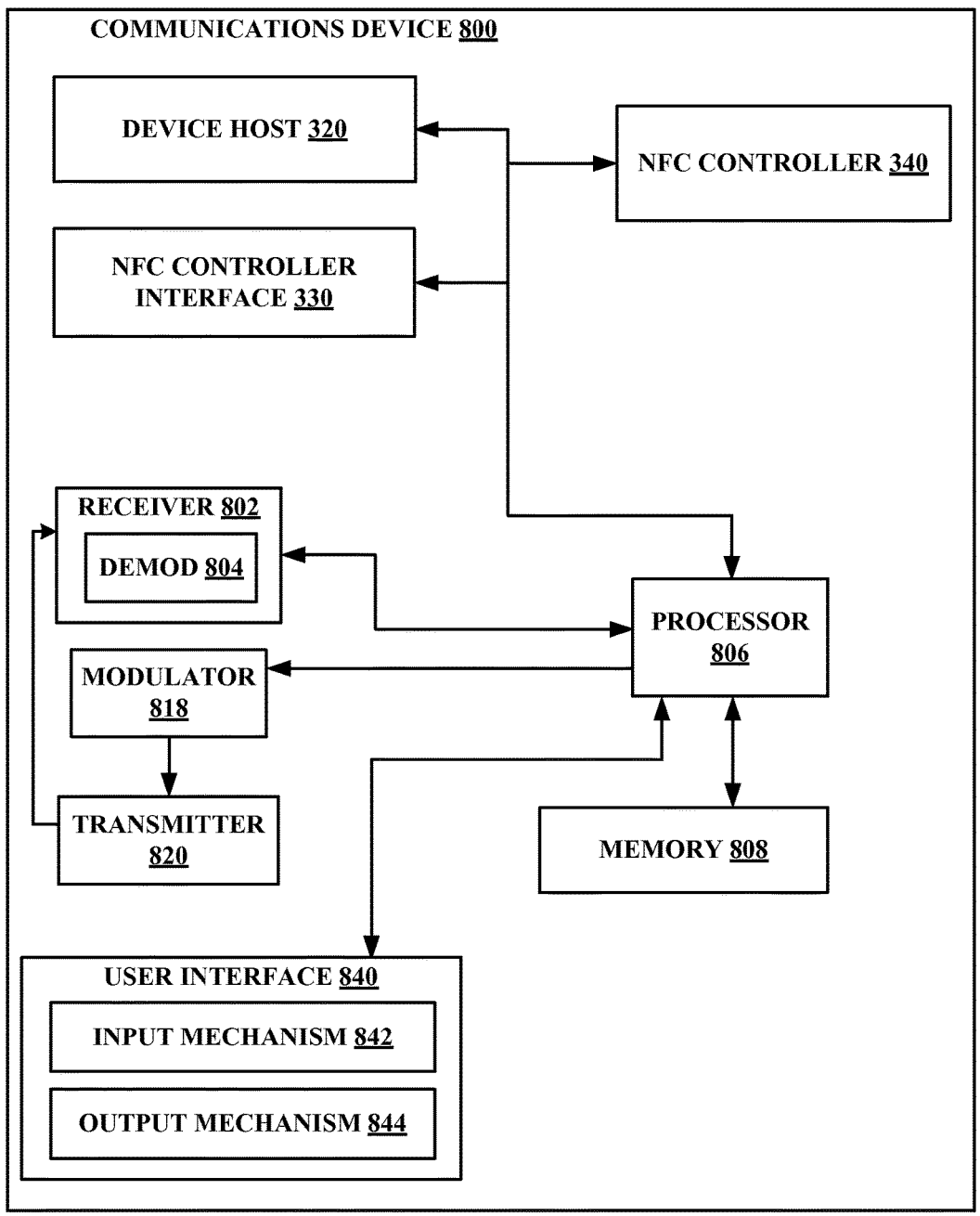
FIG. 8 is a functional block diagram example architecture of a communications device in accordance with an aspect of the present disclosure.

FIG. 8 illustrates an example architecture of communications device 800. Communications device may include NFC device 310, 702, remote NFC device 380, 704, etc., and may thus include components thereof and/or perform the associated functions described above. As depicted in FIG. 8, communications device 800 includes receiver 802 that receives a signal from, for instance, a receive antenna (not shown), performs typical actions on (e.g., filters, amplifies, downconverts, etc.) the received signal, and digitizes the conditioned signal to obtain samples. Receiver 802 can include a demodulator 804 that can demodulate received symbols and provide them to processor 806 for channel estimation. Processor 806 can be a processor dedicated to analyzing information received by receiver 802 and/or generating information for transmission by transmitter 820, a processor that controls one or more components of communications device 800, and/or a processor that both analyzes information received by receiver 802, generates information for transmission by transmitter 820, and controls one or more components of communications device 800. Further, signals may be prepared for transmission by transmitter 820 through modulator 818 which may modulate the signals processed by processor 806.

Communications device 800 can additionally include memory 808 that is operatively coupled to processor 806 and that can store data to be transmitted, received data, information related to available channels, TCP flows, data associated with analyzed signal and/or interference strength, information related to an assigned channel, power, rate, or the like, and any other suitable information for estimating a channel and communicating via the channel.

Further, transmitter 820 can generate a transmission signal for a transmitted carrier at a transmit circuit, and receiver 802 can receive a received carrier at a receive circuit. As described, transmitter 820 can be looped back to receiver 802 so the receiver 802 can receive the unmodulated carrier.

Processor 806 can include or can implement over-coupling detecting component 850 for detecting an over-coupling condition with another communications device based on comparing the received unmodulated carrier to the transmission signal generated by transmitter 820. As described, where the over-coupling condition occurs, this can be detected based on a threshold difference between a phase, amplitude, DC level, or other metric of the received carrier and transmission signal. When the over-coupling condition is detected, processor 806 can include or can implement Tx/Rx parameter component 852 for modifying a transmit or receive metric of transmitter 820 or receiver 802, as described, to mitigate the over-coupling condition. Processor 806 may also include or implement filter bypassing component 854 for bypassing one or more filters or other signal processing components of communications device 800 that may exist between the receiver 802 and over-coupling detecting component 850 to facilitate detection of over-coupling in the signal unaltered by the components.

It will be appreciated that data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods may comprise, without being limited to, these and any other suitable types of memory. For example, memory 808 can include instructions for performing the functions of the various components described herein.

Communications device 800 may include NFC controller interface (NCI) 330. In an aspect, NCI 330 may be configured to enable communications between a NFC controller 340 and device host 320. Additionally, communications device 800 may include user interface 840. User interface 840 may include input mechanisms 842 for generating inputs into communications device 800, and output mechanism 844 for generating information for consumption by the user of the communications device 800. For example, input mechanism 842 may include a mechanism such as a key or keyboard, a mouse, a touch-screen display, a microphone, etc. Further, for example, output mechanism 844 may include a display, an audio speaker, a haptic feedback mechanism, etc. In the illustrated aspects, the output mechanism 844 may include a display configured to present media content that is in image or video format or an audio speaker to present media content that is in an audio format.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH, near-field communications (NFC-A, NFC-B, NFC,-f, etc.), and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules configured to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of near field communication (NFC), comprising:
    receiving, at an NFC controller, an NFC controller interface (NCI) indication from a device host, wherein the NCI indication specifies a screen state of the device host; and
    adjusting one or more NFC modes at the NFC controller based on the NCI indication, wherein the receiving and the adjusting are performed while maintaining a radio frequency discovery state, and wherein adjusting the one or more NFC modes comprises switching, based on the screen state, from a first NFC mode corresponding to a previous screen state, that is from the group consisting of a peer-to-peer mode, a card emulation mode, and a tag read/write, to a second NFC mode different than the first NFC mode and corresponding to the screen state, that is selected from the group consisting of the peer-to-peer mode, the card emulation mode, and the tag read/write mode,
    wherein adjusting the one or more NFC modes at the NFC controller further comprises adjusting the one or more NFC modes at the NFC controller without transitioning to a radio frequency idle state while maintaining the radio frequency discovery state.

2. The method of claim 1, wherein adjusting the one or more NFC modes includes adjusting to one or more of a peer-to-peer mode, a card emulation mode and a tag read/write mode based on the screen state.

3. The method of claim 1, wherein the screen state indicates one of a screen ON state, a screen OFF state and a screen state LOCK.

4. The method of claim 3, wherein adjusting one or more NFC modes includes adjusting to a polling state and a listening state corresponding to the screen state ON, and
    wherein the polling state includes one or both of a peer-to-peer mode and a tag read/write mode.

5. The method of claim 3, wherein adjusting one or more NFC modes includes adjusting to a listening state corresponding to the screen state OFF and the screen state LOCK, and wherein the listening state includes a card emulation mode.

6. The method of claim 1, wherein the one or more NFC modes correspond to a radio frequency communication state including at least one or both of a polling state or a listening state, and wherein adjusting the one or more NFC modes includes adjusting the radio frequency communication state.

7. The method of claim 1, wherein the screen state is different from a previous screen state of the device host.

8. The method of claim 1, wherein the NCI indication triggers the adjustment of the one or more NFC modes by the NFC controller.

9. An apparatus for near field communication (NFC), comprising:
    means for receiving, at an NFC controller, an NFC controller interface (NCI) indication from a device host, wherein the NCI indication specifies a screen state of the device host; and
    means for adjusting one or more NFC modes at the NFC controller based on the NCI indication, wherein the means for receiving and the means for adjusting are performed while maintaining a radio frequency discovery state, and wherein the means for adjusting the one or more NFC modes comprises means for switching, based on the screen state, from a first NFC mode, corresponding to a previous screen state, selected from the group consisting of a peer-to-peer mode, a card emulation mode and a tag read/write mode to a second NFC mode, different than the first NFC mode and corresponding to the screen state, that is selected from the group consisting of the peer-to-peer mode, the card emulation mode, and the tag read/write mode,
    wherein the means for adjusting the one or more NFC modes at the NFC controller further comprises means for adjusting the one or more NFC modes at the NFC controller without transitioning to a radio frequency idle state while maintaining the radio frequency discovery state.

10. The apparatus of claim 9, wherein means for adjusting the one or more NFC modes includes means for adjusting to one or more of a peer-to-peer mode, a card emulation mode or a tag read/write mode based on the screen state.

11. The apparatus of claim 9, wherein the screen state indicates one of a screen ON state, a screen OFF state or a screen state LOCK.

12. The apparatus of claim 11, wherein means for adjusting one or more NFC modes includes at least one or both of means for adjusting to a polling state and a listening state corresponding to the screen state ON, and wherein the polling state includes one or both of a peer-to-peer mode and a tag read/write mode and means for adjusting to a listening state corresponding to the screen state OFF and the screen state LOCK, and wherein the listening state includes a card emulation mode.

13. The apparatus of claim 9, wherein the one or more NFC modes correspond to a radio frequency communication state including at least one or both of a polling state or a listening state, and wherein means for adjusting the one or more NFC modes includes means for adjusting the radio frequency communication state.

14. A non-transitory computer-readable medium storing computer executable code for near field communication (NFC), comprising:
    code executable to receive, at an NFC controller, an NFC controller interface (NCI) indication from a device host, wherein the NCI indication specifies a screen state of the device host; and
    code executable to adjust one or more NFC modes at the NFC controller based on the NCI indication, wherein the code executable to receive and the code executable to adjust are performed while maintaining a radio frequency discovery state, and wherein the code executable to adjust the one or more NFC modes comprises code executable to switch, based on the screen state, from a first NFC mode, corresponding to a previous screen state, selected from the group consisting of a peer-to-peer mode, a card emulation mode and a tag read/write mode to a second NFC mode, different than the first NFC mode and corresponding to the screen state, that is selected from the group consisting of the peer-to-peer mode, the card emulation mode, and the tag read/write mode,
    wherein the code for adjusting the one or more NFC modes at the NFC controller further comprises code for adjusting the one or more NFC modes at the NFC controller without transitioning to a radio frequency idle state while maintaining the radio frequency discovery state.

15. The non-transitory computer-readable medium of claim 14, wherein the code executable to adjust the one or more NFC modes includes code executable to adjust to one or more of a peer-to-peer mode, a card emulation mode or a tag read/write mode based on the screen state.

16. The non-transitory computer-readable medium of claim 14, wherein the screen state indicates one of a screen ON state, a screen OFF state or a screen state LOCK.

17. The non-transitory computer-readable medium of claim 16, wherein the code executable to adjust one or more NFC modes includes at least one or both of code executable to adjust to a polling state and a listening state corresponding to the screen state ON, and wherein the polling state includes one or both of a peer-to-peer mode and a tag read/write mode and code executable to adjust to a listening state corresponding to the screen state OFF and the screen state LOCK, and wherein the listening state includes a card emulation mode.

18. The non-transitory computer-readable medium of claim 14, wherein the one or more NFC modes correspond to a radio frequency communication state including at least one or both of a polling state or a listening state, and wherein the code executable to adjust the one or more NFC modes includes code executable to adjust the radio frequency communication state.

19. An apparatus for near field communication (NFC), comprising:
    an NFC controller configured to:
        receive an NFC controller interface (NCI) indication from a device host, wherein the NCI indication specifies a screen state of the device host; and
        adjust one or more NFC modes at the NFC controller based on the NCI indication, wherein the NFC controller is further configured to receive the NCI indication and to adjust the one or more NFC modes while maintaining a radio frequency discovery state, and wherein NFC controller is further configured to switch, based on the screen state, from a first NFC mode, corresponding to a previous screen state, selected from the group consisting of a peer-to-peer mode, a card emulation mode and a tag read/write mode to a second NFC mode, different than the first NFC mode and corresponding to the screen state, that is selected from the group consisting of the peer-to-peer mode, the card emulation mode, and the tag read/write mode, wherein the NFC controller configured to adjust the one or more NFC modes is further configured to adjust the one or more NFC modes at the NFC controller without transitioning to a radio frequency idle state while maintaining the radio frequency discovery state.

20. The apparatus of claim 19, wherein the NFC controller is further configured to adjust the one or more NFC modes by adjusting to one or more of a peer-to-peer mode, a card emulation mode or a tag read/write mode based on the screen state.

21. The apparatus of claim 19, wherein the screen state indicates one of a screen ON state, a screen OFF state or a screen state LOCK.

22. The apparatus of claim 21, wherein the NFC controller is further configured to adjust one or more NFC modes by adjusting to a polling state and a listening state corresponding to the screen state ON, and wherein the polling state includes one or both of a peer-to-peer mode and a tag read/write mode.

23. The apparatus of claim 21, wherein the NFC controller is further configured to adjust one or more NFC modes by adjusting to a listening state corresponding to the screen state OFF and the screen state LOCK, and wherein the listening state includes a card emulation mode.

24. The apparatus of claim 19, wherein the one or more NFC modes correspond to a radio frequency communication state including at least one or both of a polling state or a listening state, and wherein the NFC controller is further configured to adjust the one or more NFC modes by adjusting the radio frequency communication state.

25. The apparatus of claim 19, wherein the screen state is different from a previous screen state of the device host.

26. The apparatus of claim 19, wherein the NCI indication triggers the adjustment of the one or more NFC modes by the NFC controller.

* * * * *